(12) United States Patent
Matsumoto et al.

(10) Patent No.: US 7,327,499 B2
(45) Date of Patent: Feb. 5, 2008

(54) IMAGE READING APPARATUS

(75) Inventors: Masashi Matsumoto, Tsubata-machi (JP); Minoru Masuda, Tsubata-machi (JP); Yasunori Miyauchi, Unoke-machi (JP)

(73) Assignee: PFU Limited, Ishikawa (JP)

( * ) Notice: Subject to any disclaimer, the term of this patent is extended or adjusted under 35 U.S.C. 154(b) by 933 days.

(21) Appl. No.: 10/481,826

(22) PCT Filed: Oct. 10, 2002

(86) PCT No.: PCT/JP02/10520

§ 371 (c)(1), (2), (4) Date: Dec. 23, 2003

(87) PCT Pub. No.: WO03/034706

PCT Pub. Date: Apr. 24, 2003

(65) Prior Publication Data

US 2004/0165286 A1    Aug. 26, 2004

(30) Foreign Application Priority Data

Oct. 10, 2001   (JP) .............................. 2001-312951

(51) Int. Cl.
*H04N 1/04* (2006.01)

(52) U.S. Cl. ............ 358/474; 358/497; 358/486; 358/483; 359/821; 359/822; 359/823

(58) Field of Classification Search ............... 358/497, 358/474, 494, 486, 487, 488, 475, 483, 482, 358/505, 509, 512–514; 250/208.1, 239, 250/216, 234–236; 359/821, 822, 672, 381, 359/421, 823; 382/312, 318, 319
See application file for complete search history.

(56) References Cited

U.S. PATENT DOCUMENTS

| 5,552,939 A | 9/1996 | Tseng et al. |
| 5,883,727 A | 3/1999 | Tsai |
| 5,903,001 A | 5/1999 | Tsai |
| 5,907,411 A | 5/1999 | Han |
| 5,959,654 A | 9/1999 | Yoshida |

(Continued)

FOREIGN PATENT DOCUMENTS

EP    0 920 183 A1    6/1999

(Continued)

OTHER PUBLICATIONS

European Search Report, dated Apr. 27, 2006.

*Primary Examiner*—Cheukfan Lee

(57) ABSTRACT

An image reading apparatus includes a lens unit (4) which has a low-resolution lens (1), a high-resolution lens (2), and a first driving unit (3) for driving them, and a second driving unit (5) for driving the lens unit (4). At a first resolution, the low-resolution lens (1) is placed on the optical axis at a first location and the high-resolution lens (2) is placed off the optical axis. At a second resolution higher than the first resolution, the low-resolution lens (1) is placed off the optical axis and the high-resolution lens (2) is placed on the optical axis at a second location. At a third resolution higher than the second resolution, the low-resolution lens (1) is placed off the optical axis and the high-resolution lens (2) is placed on the optical axis at a third location.

12 Claims, 11 Drawing Sheets

U.S. PATENT DOCUMENTS

| | | |
|---|---|---|
| 5,969,845 A | 10/1999 | Tsai et al. |
| 5,995,244 A * | 11/1999 | Tsai ........................... 358/474 |
| 6,008,944 A * | 12/1999 | Tsai ........................... 359/618 |
| 6,081,363 A * | 6/2000 | Shen et al. ................. 359/196 |
| 6,233,063 B1 | 5/2001 | Bernasconi et al. |
| 6,339,482 B1 * | 1/2002 | Tsai et al. ................... 358/474 |
| 6,424,433 B1 * | 7/2002 | Miyauchi et al. ........... 358/471 |
| 6,577,410 B1 * | 6/2003 | Tsai ........................... 358/474 |
| 6,624,914 B1 * | 9/2003 | Hendrix et al. ............. 358/484 |
| 7,209,267 B2 * | 4/2007 | Stocker ...................... 358/474 |

FOREIGN PATENT DOCUMENTS

| | | |
|---|---|---|
| GB | 2 325 532 A | 11/1998 |
| JP | 9-163086 | 6/1997 |
| JP | 10-255025 | 9/1998 |
| JP | 11-8737 | 1/1999 |
| JP | 2001-169048 | 6/2001 |
| JP | 2002-540682 | 11/2002 |
| WO | WO 00/57628 | 9/2000 |

* cited by examiner

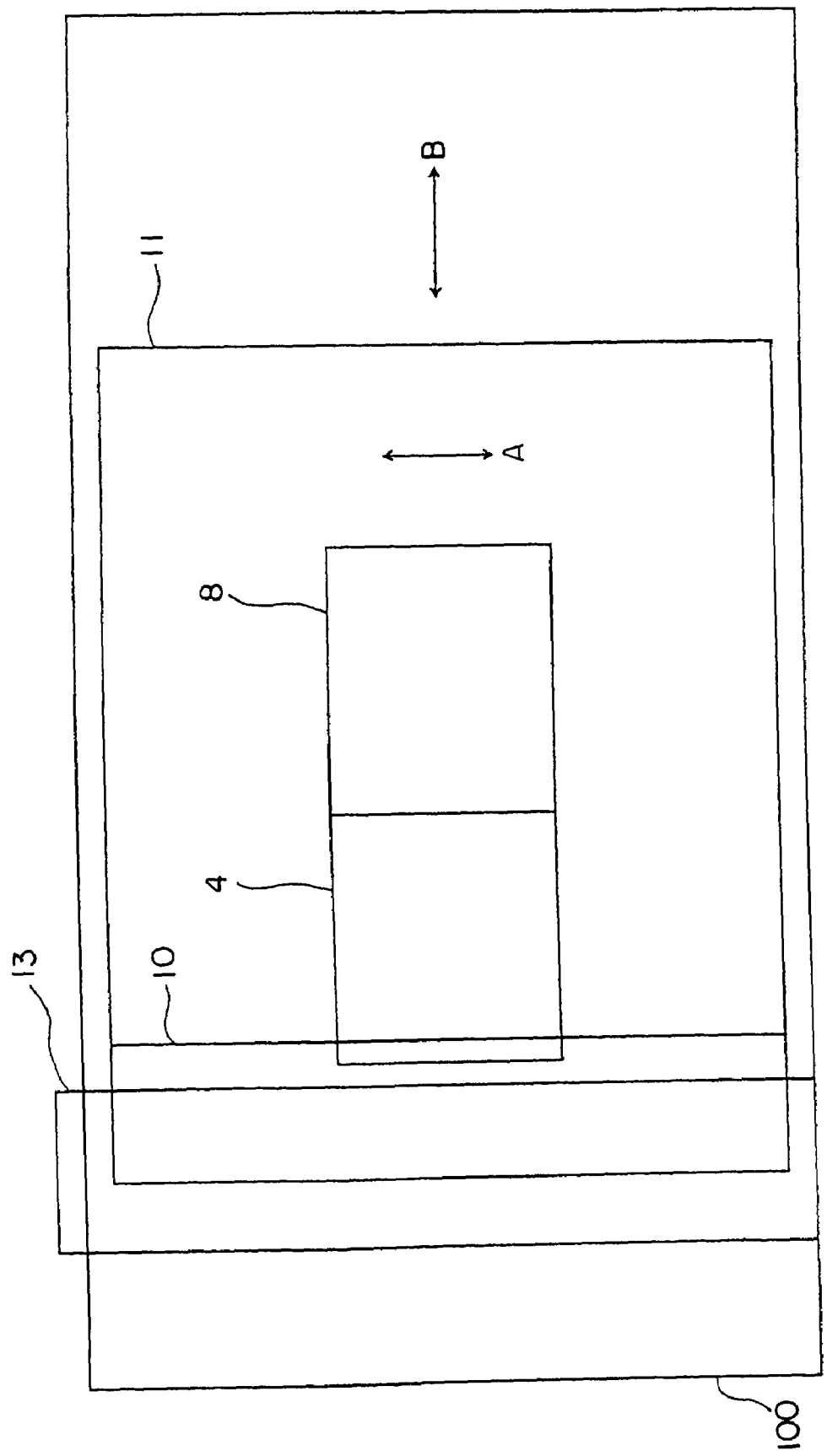

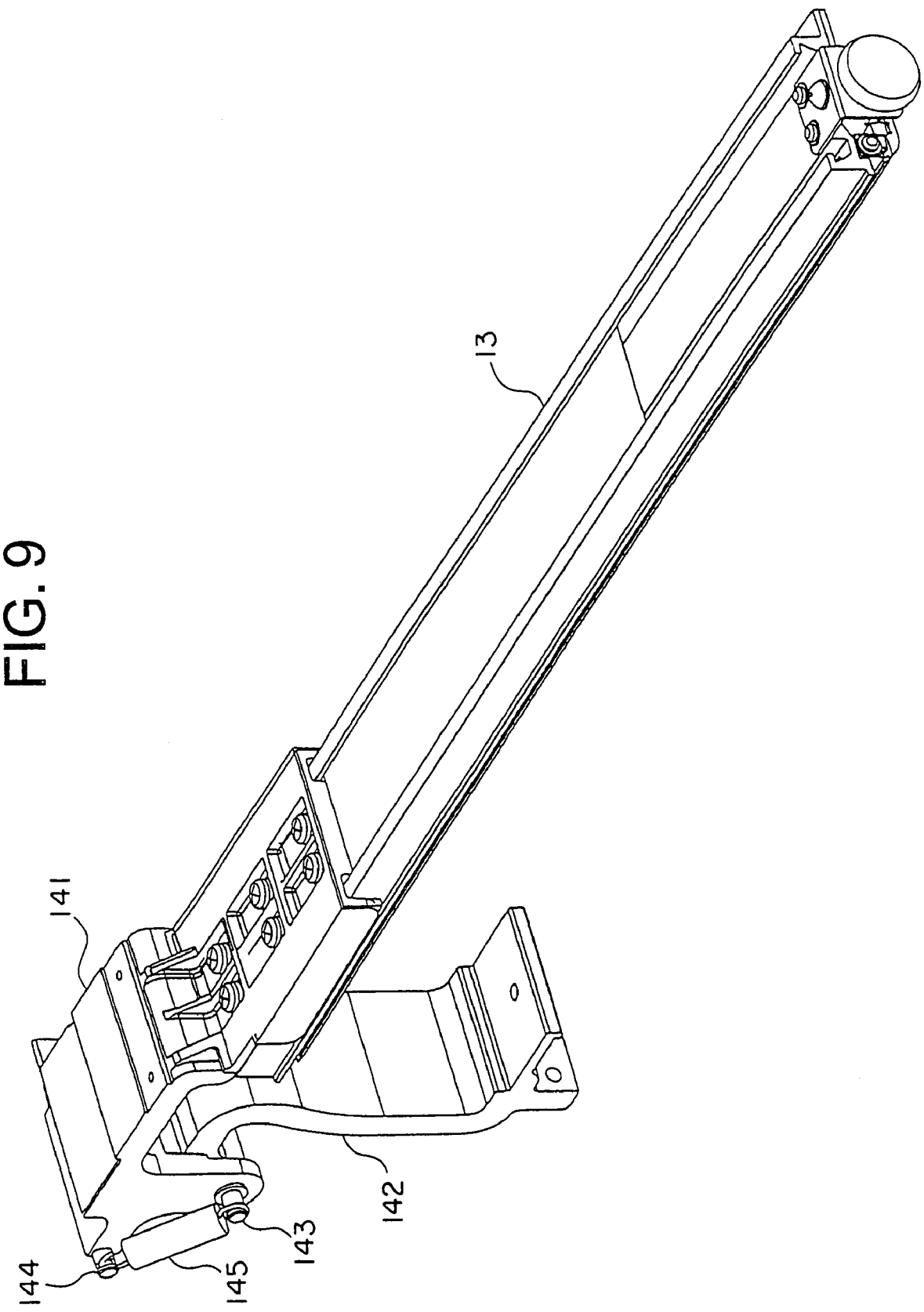

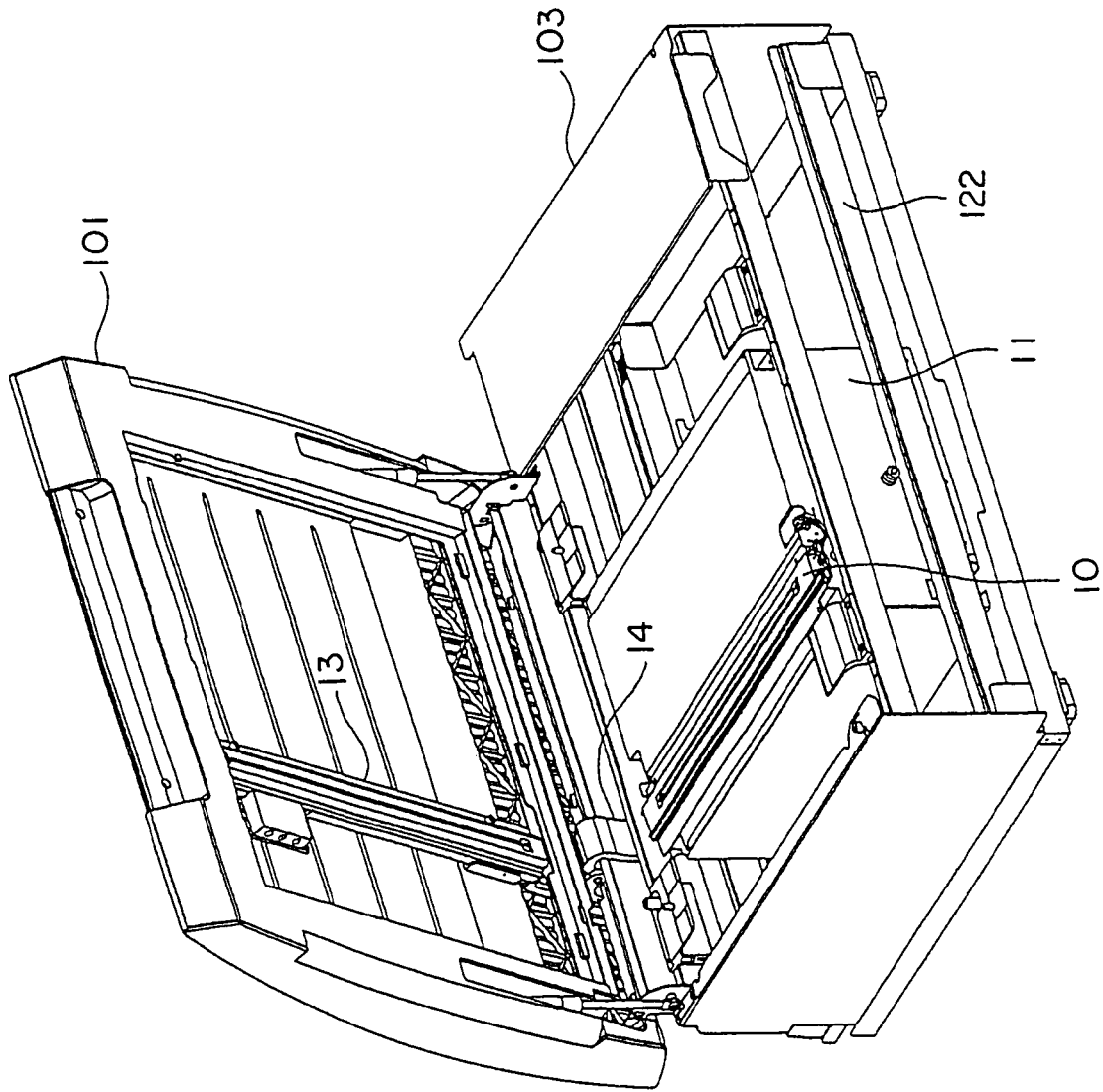

IMAGE READING APPARATUS

TECHNICAL FIELD

This invention relates to an image reading apparatus, and more particularly to an image reading apparatus which has two lenses and read an image at any one of three resolutions which are realized by moving the two lenses.

BACKGROUND ART

Various image reading apparatuses such as scanners include a device with particularly high resolutions (hereinafter referred to as a high-resolution scanner). Such a high-resolution scanner can typically switch among several resolutions, for example, 700 dpi, 2400 dpi, and 4000 dpi. Since each of these three resolutions requires a lens for reading with its resolution, three lenses are required in a case that the resolutions are switched with such three levels, for example. The price of a lens usually increases with resolution. In addition, switching of resolutions results in reduction in its readable region. The resultant readable region is limited to a central portion in the width direction (main scanning direction) of its document table (platen glass).

As described above, the high-resolution scanner requires the same number of lenses as that of resolutions to be switched. The lenses are very expensive and then the high-resolution scanner is also expensive. In particular, this tendency may become more pronounced in a scanner that provides higher resolutions in multiple numbers.

As also described above, switching of resolutions will limit the readable region to a central portion in the main scanning direction. Thus, all image data cannot be acquired throughout the whole range covered by the whole document table (that is, the whole image reading region).

It is an object of the present invention to provide a high-resolution image reading apparatus which can read an image with fewer lenses and more resolutions.

DISCLOSURE OF THE INVENTION

An image reading apparatus of the present invention comprises a lens unit having a low-resolution lens, a high-resolution lens and a first driving unit to drive the lenses, and a second driving unit to drive the lens unit. During a reading operation at a first resolution, the first driving unit drives the low-resolution lens and high-resolution lens and the second driving unit drives the lens unit, whereby the low-resolution lens is placed on the optical axis at a first location and the high-resolution lens is placed off the optical axis. During a reading operation at a second resolution, higher than the first resolution, the first driving unit drives the low-resolution lens and high-resolution lens and the second driving unit drives the lens unit, whereby the low-resolution lens is placed off the optical axis and the high-resolution lens is placed on the optical axis at a second location. During a reading operation at a third resolution, higher than the second resolution, the first driving unit drives the low-resolution lens and high-resolution lens and the second driving unit drives the lens unit, whereby the low-resolution lens is placed off the optical axis and the high-resolution lens is placed on the optical axis at a third location.

According to the image reading apparatus of the present invention, the two lenses of low-resolution and high resolution can provide the first through third resolutions (that is, three focuses). In particular, the single high-resolution lens can provide the second and third resolutions. Therefore, the number of lenses can be reduced to the number which is smaller than that of the resolutions to be switched. This can reduce the price of the image reading apparatus satisfactorily. In addition, since the higher second and third resolutions can be achieved with the single lens, many different resolutions can be provided without the need for more expensive lenses. This can also reduce the price of the image reading apparatus more effectively.

BRIEF DESCRIPTION OF THE DRAWINGS

FIG. 3 shows the configuration of the image reading apparatus.

FIG. 4 shows the configuration of the image reading apparatus, wherein

FIG. 5 shows the configuration of the image reading apparatus, wherein

FIG. 9 shows the configuration of the image reading apparatus and is a perspective view of a transparency lamp unit.

FIG. 10 shows the configuration of the image reading apparatus and is a perspective view with the cover removed.

FIG. 11 shows the configuration of the image reading apparatus, wherein

BEST MODE FOR CARRYING OUT THE INVENTION

Figure 1:
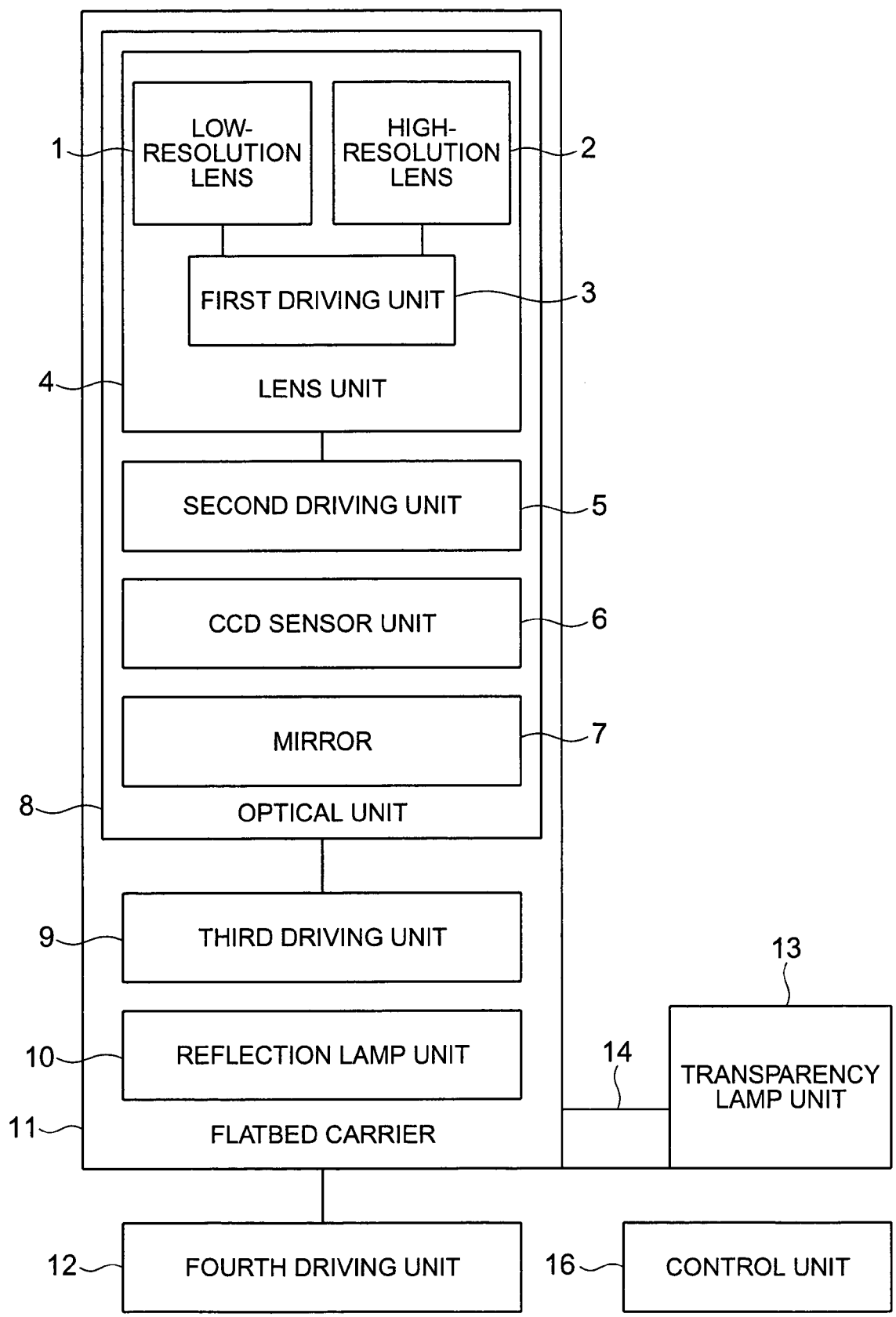
FIG. 1 shows the configuration of an image reading apparatus.
Figure 2:
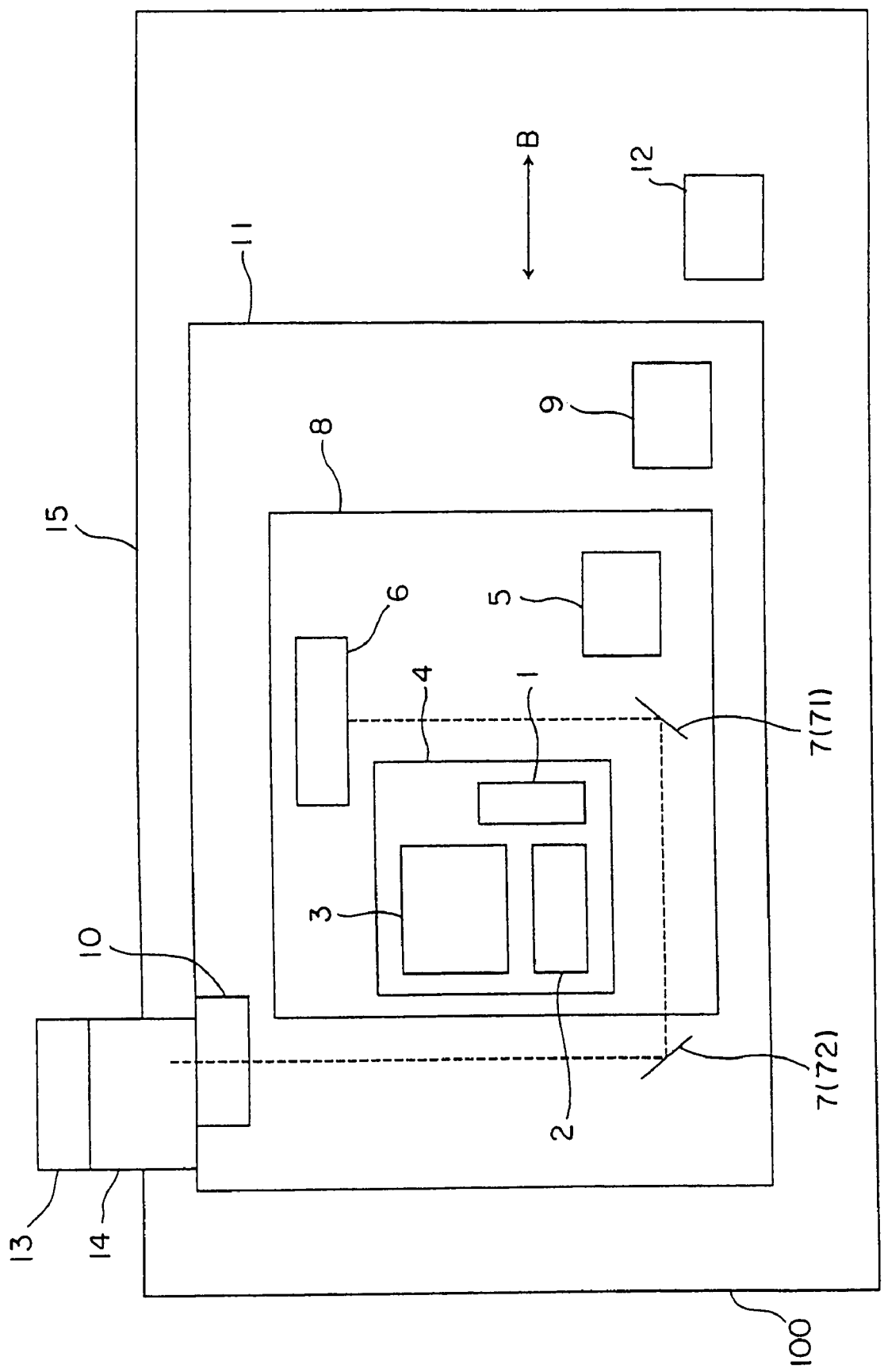
FIG. 2 shows the configuration of the image reading apparatus.

FIGS. 1 through 3 show the configuration of an image reading apparatus and schematically show the configuration of an image reading apparatus according to the present invention. More specifically, FIG. 1 is a block diagram of the image reading apparatus, FIG. 2 is a schematic cross section of the image reading apparatus, and FIG. 3 is a schematic plan view of the image reading apparatus.

In this example, the image reading apparatus comprises a flatbed-type high-resolution scanner (hereinafter referred to as a high-resolution scanner) having a document table 15 on its top. The document table 15 comprises a platen glass, for example. Although not shown, the platen glass is provided to the frame (housing 100 of the high-resolution scanner) in a removable manner. This may allow the user to clean out dirt and dust inside the housing 100 of the high-resolution scanner. Replacement of the platen glass will be described later.

The high-resolution scanner comprises a control unit 16. The control unit 16 controls first through fourth driving units 3, 5, 9, 12 as described below to move their driving targets in a predetermined direction by a predetermined distance for reading an image on a medium, respectively.

The high-resolution scanner comprises a lens unit 4. As shown in FIG. 4 etc., the lens unit 4 comprises a low-resolution lens 1, a high-resolution lens 2, and the first driving unit 3. The low-resolution lens 1 is used for a reading operation with a resolution of 700 dpi, for example, at a first location, as described below. The high-resolution lens 2 is used for a reading operation with a resolution of 2400 dpi, for example, at a second location and for a reading operation with a resolution of 4000 dpi, for example, at a third location, as described below. The lenses 1 and 2 move to provide the predetermined resolutions as described below. The first driving unit 3 drives the lenses 1 and 2. The first driving unit 3 comprises a driving mechanism including such as a motor, a rack, and gears (not shown). The lenses 1 and 2 are moved into a predetermined direction by the first driving unit 3.

Figure 4A:
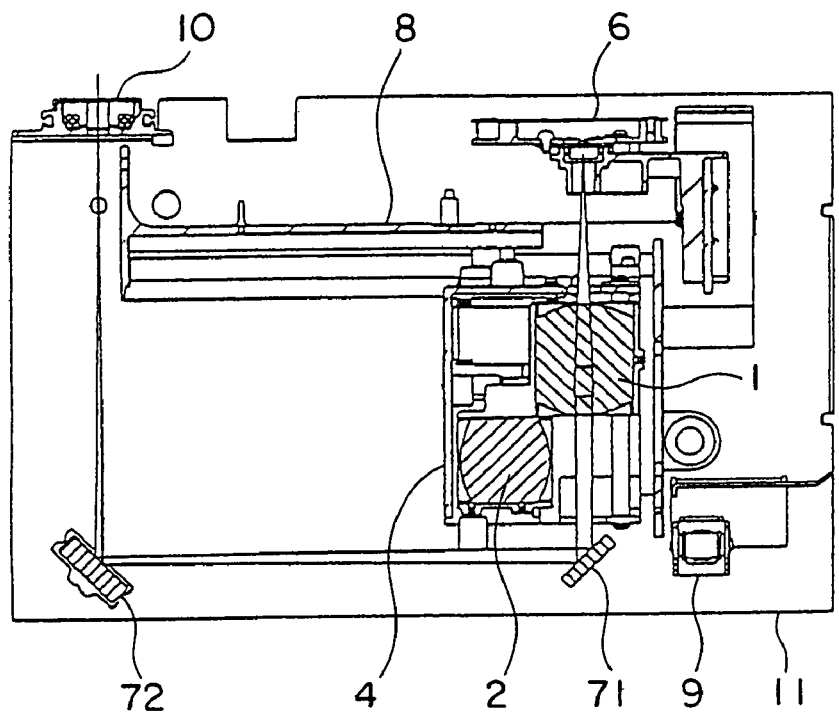
FIGS. 4A and 4B are cross sections of an optical unit including a lens unit.

The high-resolution scanner comprises an optical unit 8. The lens unit 4 is part of the optical unit 8. More specifically, the optical unit 8 has, as shown in FIG. 4A etc., the lens unit 4, the second driving unit 5 (not shown in FIG. 4A), a CCD sensor unit 6, and at least first and second mirrors 7 (71, 72). The lens unit 4 moves to provide the predetermined resolutions as described below. The second driving unit 5 drives the lens unit 4. The lens unit 4 is moved into a predetermined direction by the second driving unit 5. The CCD sensor unit 6 is a line sensor which comprises a well-known charge-coupled device (CCD), reads an image on a medium placed on the document table 15, and provides output image data (electronic data).

The second driving unit 5 comprises a driving mechanism including such as a motor, a rack, and gears (not shown). In practice, the motor for the first driving unit 3 is also used as the motor for the second driving unit 5.

The first mirror 71 turns the direction of the optical axis (indicated by a dotted line in FIG. 2) in the optical unit 8. The second mirror 72 turns the direction of the optical axis in the flatbed carrier 11. More specifically, the first mirror 71 turns light from the second mirror 72 substantially by a right angle to project it onto the CCD sensor unit 6, and the second mirror 72 turns light from a light source substantially by a right angle onto the first mirror 71. The light from the light source is light which is supplied by a transparency lamp unit 13 and passes through a transparency-film document or light which is supplied by a reflection lamp unit 10 and reflected by a reflection-copy document. In the optical unit 8, as shown in FIG. 4A etc., the optical axis is positioned so that it may connect the CCD sensor unit 6 with the first mirror 71 and the first mirror 71 with the second mirror 72 during a reading operation.

Figure 6:
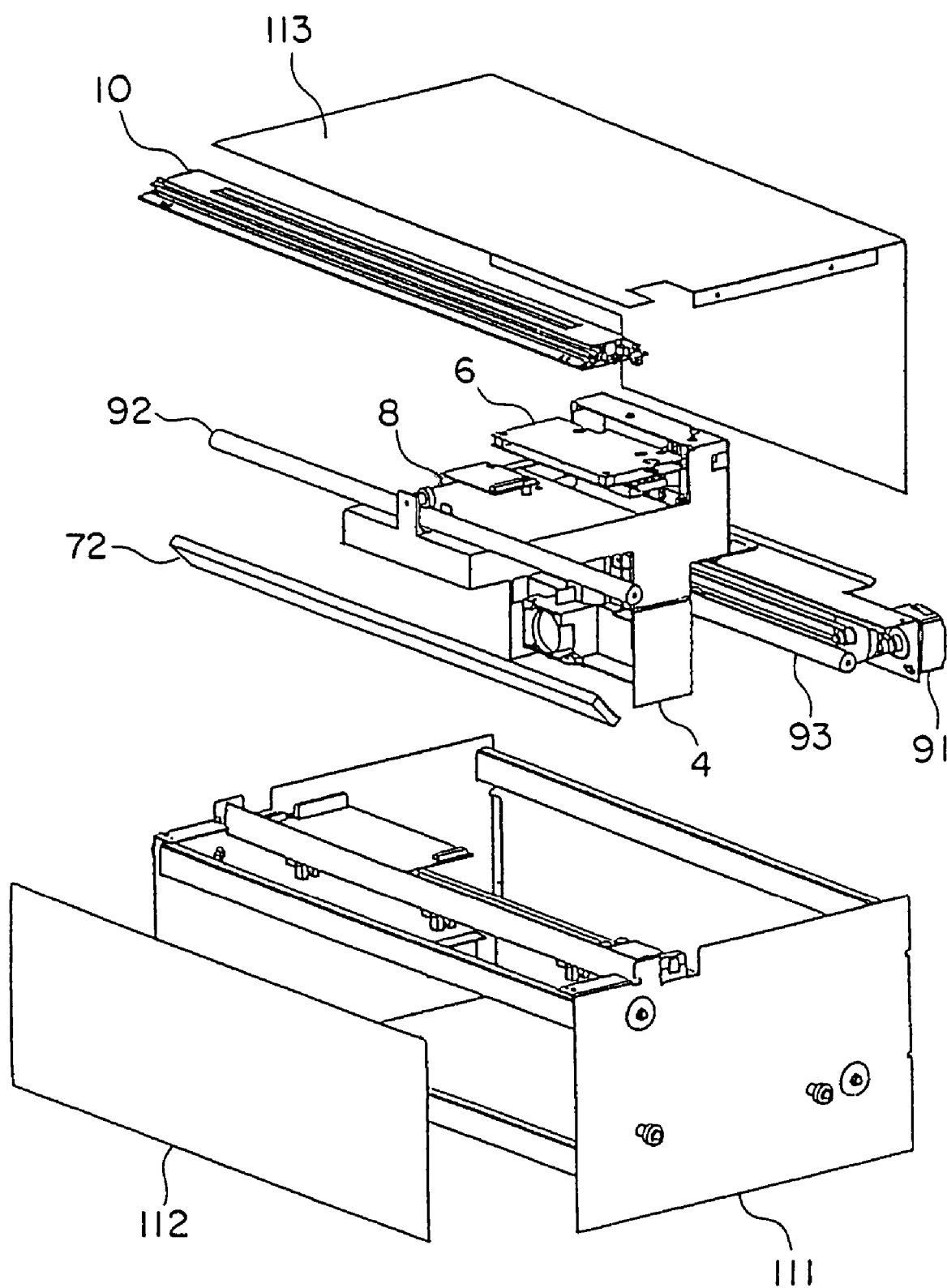
FIG. 6 shows the configuration of the image reading apparatus and is a perspective view of an optical unit including a lens unit.
Figure 7:
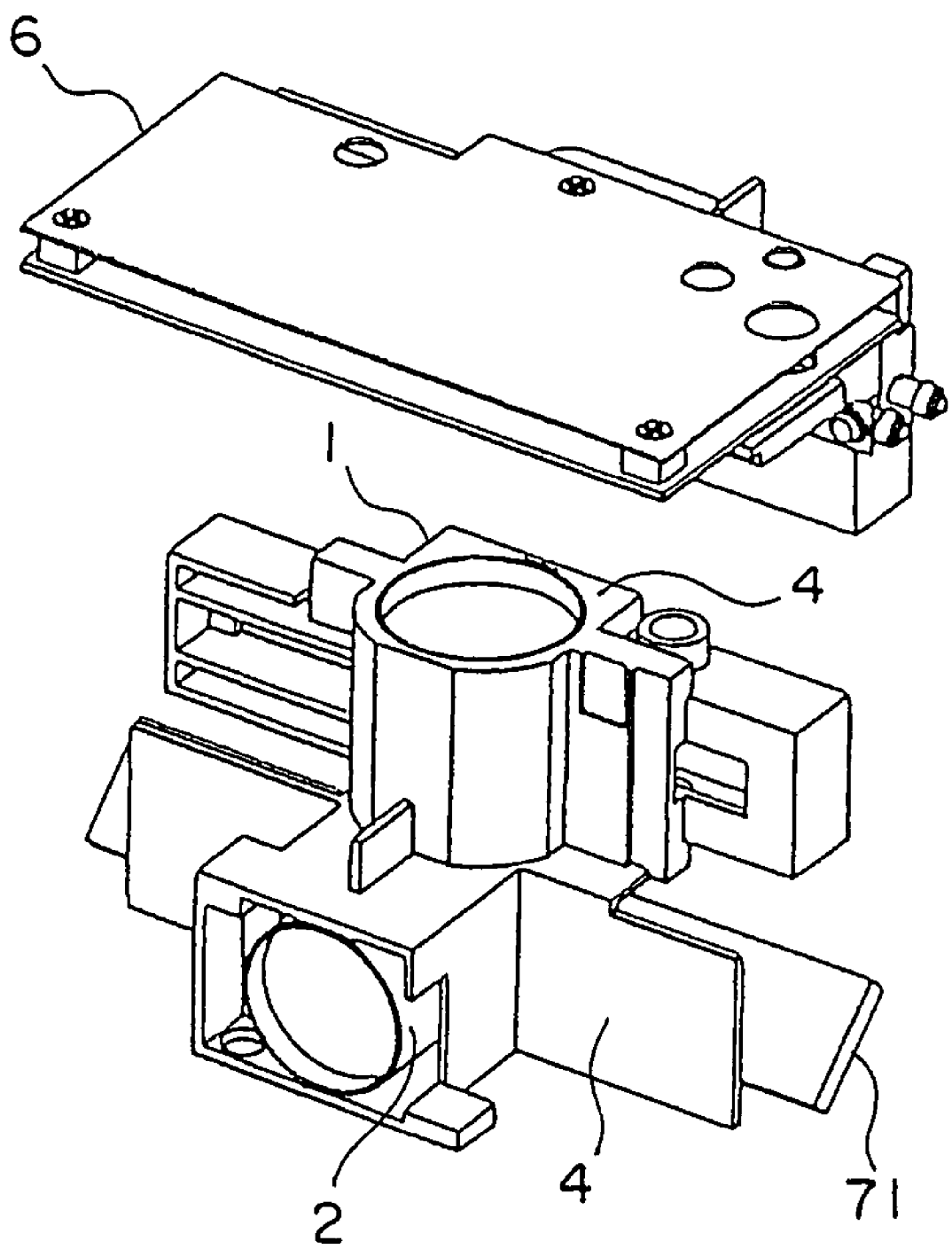
FIG. 7 shows the configuration of the image reading apparatus and is a perspective view of a lens unit in part.

FIG. 6 shows a specific example of the configuration of the optical unit 8 and the lens unit 4 and FIG. 7 shows the configuration of the lens unit 4 in part.

In FIG. 6, the optical unit 8 is housed within the flatbed carrier 11 as described below. The optical unit 8 is driven by an X motor 91 (and a belt) in the main scanning direction (X direction), along with the guide of two X shafts 92, 93. The X motor 91 and the X shafts 92, 93 constitute the driving unit 9. The CCD sensor unit 6 is integrally provided to the optical unit 8 and moves together therewith. The second mirror 72 is fixed within the flatbed carrier 11 and is provided throughout the whole range in the main scanning direction. Similarly, the reflection lamp unit 10 is also fixed within the flatbed carrier 11 and is provided throughout the whole range in the main scanning direction.

Thus, the optical unit 8 moves throughout the whole range in the main scanning direction. As described above, during a high-resolution reading operation, the readable region is limited to a central portion in the main scanning direction. Specifically, the readable region is physically substantially equal to the CCD sensor unit 6 in a single reading line (a single raster). Then, the control unit 16 moves the optical unit 8 throughout the whole range in the main scanning direction (from the left end to the right end) during a high-resolution reading operation (with one of the first through third resolutions). This operation is repeated throughout the whole range in the sub scanning direction. By this operation, high-resolution image data can be acquired throughout the whole range of the whole document table 15 (that is, the whole image reading region).

In FIG. 7, the lens unit 4 is integrally provided with the low-resolution lens 1 and high-resolution lens 2. In the lens unit 4, the low-resolution lens 1 is provided in the vertical direction to be opposed to the CCD sensor unit 6, and the high-resolution lens 2 is provided in the sub scanning direction (Y direction). The first mirror 71 is integrally provided to the optical unit 8 and moves together therewith. Therefore, the first mirror 71 is provided not to cover through the whole area in the main scanning direction but to cover an area substantially corresponding to the width of the main scanning direction of the CCD sensor unit 6 (or the lens unit 4). The first driving unit 3 and the second driving unit 5 are integrally provided to the optical unit 8 but they are not shown in the figure. In FIG. 7, the lens unit 4 includes only two members (portions) indicated by leader lines with the reference numeral 4 and the remaining members constitute the optical unit 8.

During a reading operation with the first resolution, the control unit 16 causes the first driving unit 3 to drive the low-resolution lens 1 and high-resolution lens 2 and causes the second driving unit 5 to drive the lens unit 4. Resultant of this operation, as shown in FIG. 4A, the low-resolution lens 1 is placed on the optical axis at the first location and the high-resolution lens 2 is placed off the optical axis. The first location is defined to be on the optical axis between the CCD sensor unit 6 and the first mirror 71. This can allow the low-resolution lens 1 to be adjusted to the focus position for reading at 700 dpi, for example.

Figure 4B:
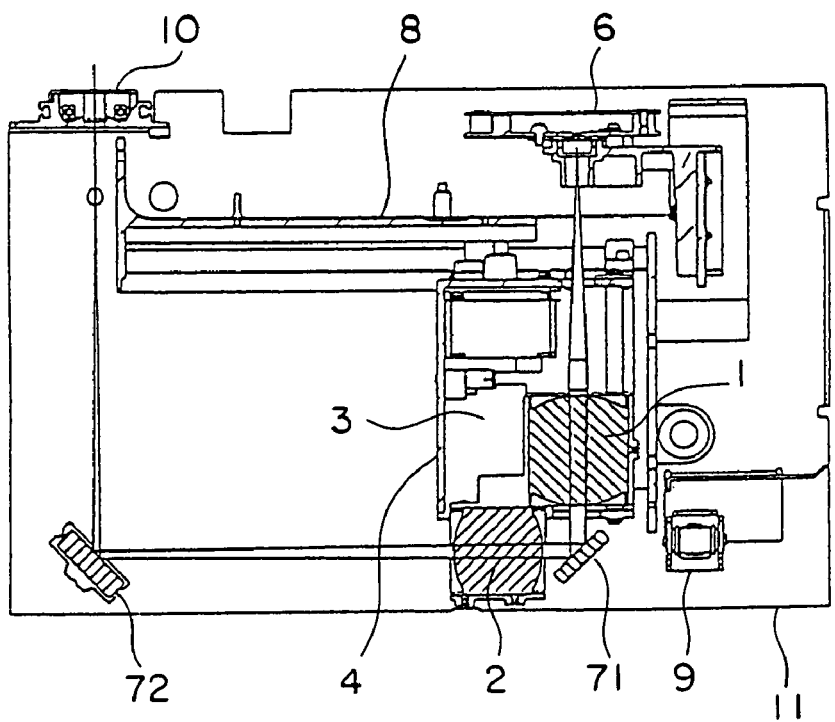
Figure 5A:
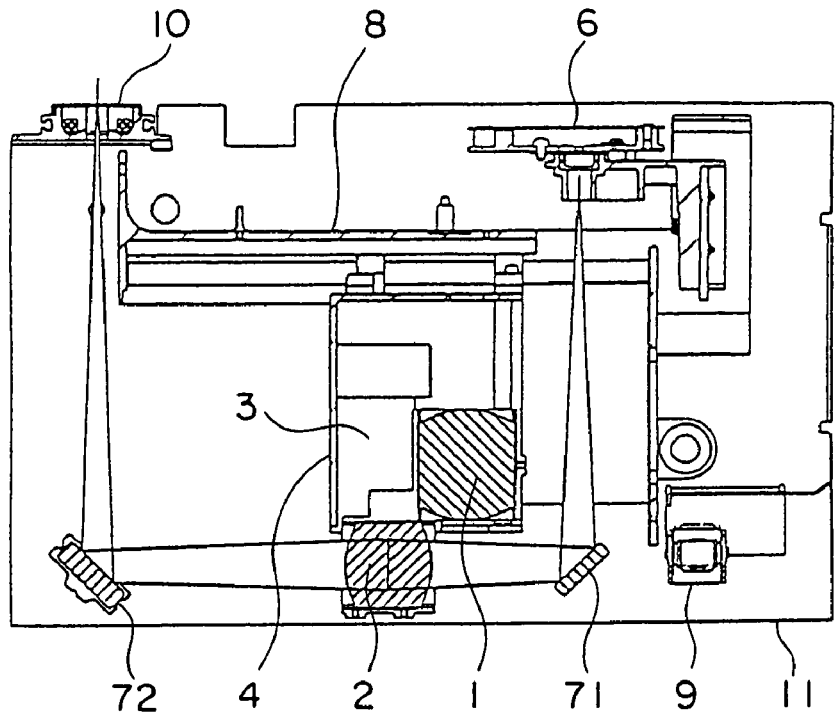
FIGS. 5A and 5B are cross sections of an optical unit including a lens unit.

During a reading operation with the second resolution, the control unit 16 causes the first driving unit 3 to drive the low-resolution lens 1 and high-resolution lens 2, as shown in FIG. 4B. The lenses land 2 are integrally provided with each other and are driven simultaneously. The driving is directed to downward of the lens unit 4. This can allow the high-resolution lens 2 to protrude from the lens unit 4 downward so that the lens 2 is located on the optical axis between the first and second mirrors 71 and 72. In addition, the control unit 16 causes the second driving unit 5 to drive the lens unit 4. The driving is directed toward the second mirror 72. By this operation, as shown in FIG. 5A, the low-resolution lens 1 is placed off the optical axis and the high-resolution lens 2 is placed on the optical axis at the second location. The second location is defined to be on the optical axis between the first mirror 71 and the second mirror 72 and closer to the first mirror 71 than the third location. This can allow the high-resolution lens 2 to be adjusted to the focus position for reading at 2400 dpi, for example.

Figure 5B:
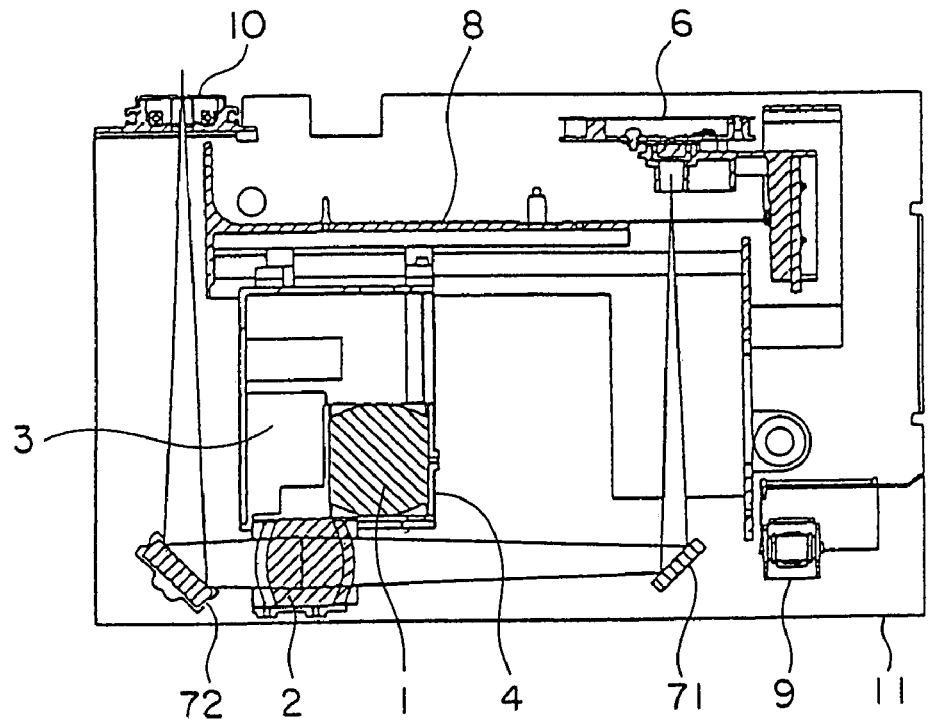

During a reading operation with the third resolution, the control unit 16 causes the first driving unit 3 to drive the low-resolution lens 1 and high-resolution lens 2 (from the position as shown in FIG. 4A) and causes the second driving unit 5 to drive the lens unit 4 (from the position as shown in FIG. 5A). By this operation, as shown in FIG. 5B, the low-resolution lens 1 is placed off the optical axis and the high-resolution lens 2 is placed on the optical axis at the third location. The third location is defined to be on the optical axis between the first mirror 71 and the second mirror 72 and closer to the second mirror 72 than the second location. That is, the third location is the position at which longitudinal magnification is to be used. This can allow the high-resolution lens 2 to be adjusted to the focus position for reading at 4000 dpi, for example.

The first through third resolutions may be switched from any one to another. Namely, the situations as shown in FIGS. 4A, 5A, and 5B may be mutually switchable. When switching, the transition from the situation in FIG. 4A to that in FIG. 5A or 5B will be made through the situation in FIG. 4B.

The high-resolution scanner comprises the flatbed carrier 11. As shown in FIG. 6, the flatbed carrier 11 has a frame 111, a front cover 112 and a cover 113. The optical unit 8 is housed within the flatbed carrier 11 as part thereof. More specifically, the flatbed carrier 11 includes the optical unit 8, the third driving unit 9 and the reflection lamp unit 10. The optical unit 8 moves in the main scanning direction (arrow A) mainly during a high-resolution reading operation. The third driving unit 9 drives the optical unit 8. The third driving unit 9 comprises a driving mechanism including such as a motor and a guide (not shown). The optical unit 8 can be moved in the main scanning direction by the third driving unit 9.

The reflection lamp unit 10 is used as a light source for reading in a case that a medium on the document table 15 is a reflection-copy document, and is provided on the whole range throughout the main scanning direction as shown in FIG. 6. The reflection lamp unit 10 is parallel to the transparency lamp unit 13 and is fixed as part of the flatbed carrier 11 so that it can move in the sub scanning direction as the flatbed carrier 11 moves.

As seen from FIGS. 4 and 6, the reflection lamp unit 10 is exposed without being covered by the cover 113 of the flatbed carrier 11. This can allow the user to replace the reflection lamp unit 10 with ease when the amount of luminous from the reflection lamp unit 10 decreases due to aging.

The high-resolution scanner comprises the flatbed carrier 11 and the fourth driving unit 12 within the housing 100. The flatbed carrier 11 is a carrier which moves in the sub scanning direction (as indicated by the arrow B) during a reading operation. The fourth driving unit 12 drives the flatbed carrier 11. The fourth driving unit 12 comprises a driving mechanism including such as a motor and a rail (not shown). The flatbed carrier 11 can be moved in the sub scanning direction by the fourth driving unit 12.

The transparency lamp unit 13 is attached to the flatbed carrier 11 with fixtures 14 (141, 142). The transparency lamp unit 13 is used as a light source for reading in a case that a medium on the document table 15 is a transparency-film document, and is provided on the whole range throughout the main scanning direction. The transparency lamp unit 13 is fixed to the flatbed carrier 11 so that it can move in the sub scanning direction together with the flatbed carrier 11 driven by the fourth driving unit 12. This can prevent the amount of luminous from the transparency lamp unit 13 from varying due to displacement between their relative positions while the flatbed carrier 11 is moving. In a conventional system, the transparency lamp unit 13 is not attached to the flatbed carrier 11 and thus, the amount of luminous may inevitably vary during the movement since they are driven separately.

FIGS. 8 through 11 show specific configurations of the flatbed carrier 11 and the transparency lamp unit 13.

Figure 8:
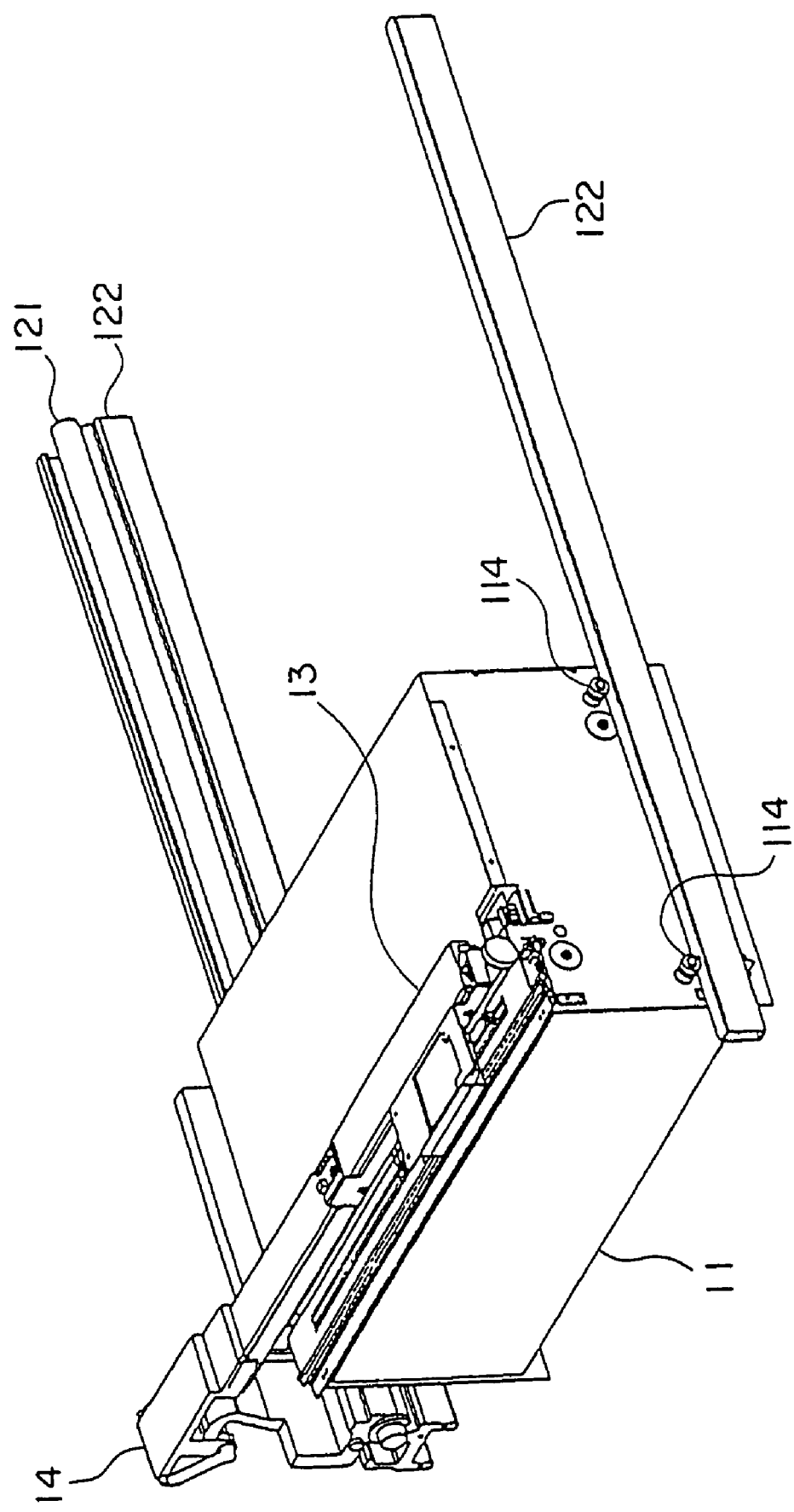
FIG. 8 shows the configuration of the image reading apparatus and is a perspective view of a flatbed carrier.

In FIG. 8, the flatbed carrier 11 has a rectangular parallelepipedic shape constructed by assembling the frame 111, the front cover 112 and the cover 113 as described above. The whole flatbed carrier 11 is driven by a carrier shaft 121 connected to the motor (not shown) of the fourth driving unit 12 along a rail 122 through the bearing 114. This can allow the flatbed carrier 11 to move in the sub scanning direction. The carrier shaft (unit) 121 and the rail 122 constitute the fourth driving unit 12.

Figure 11A:
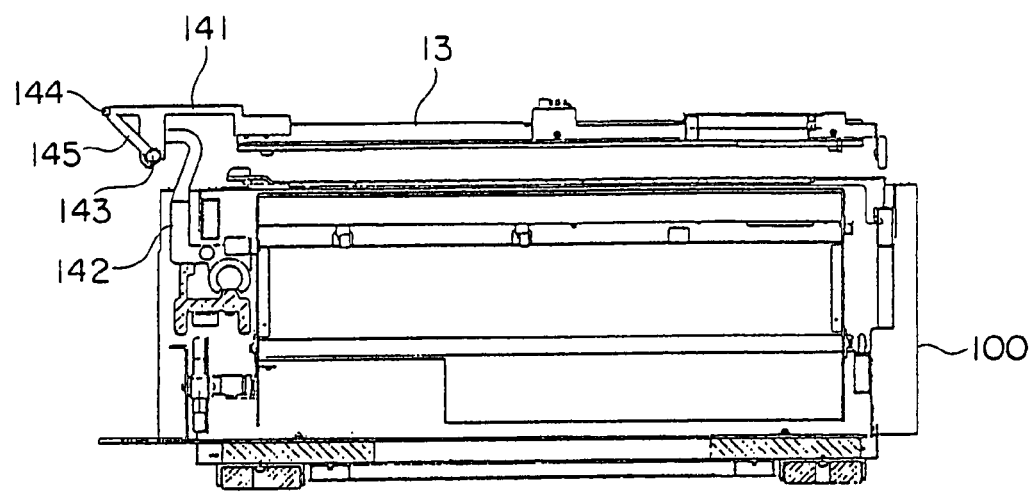
FIG. 11A is a side view with the cover removed and FIG. 11B is a perspective view with the cover removed.
Figure 11B:
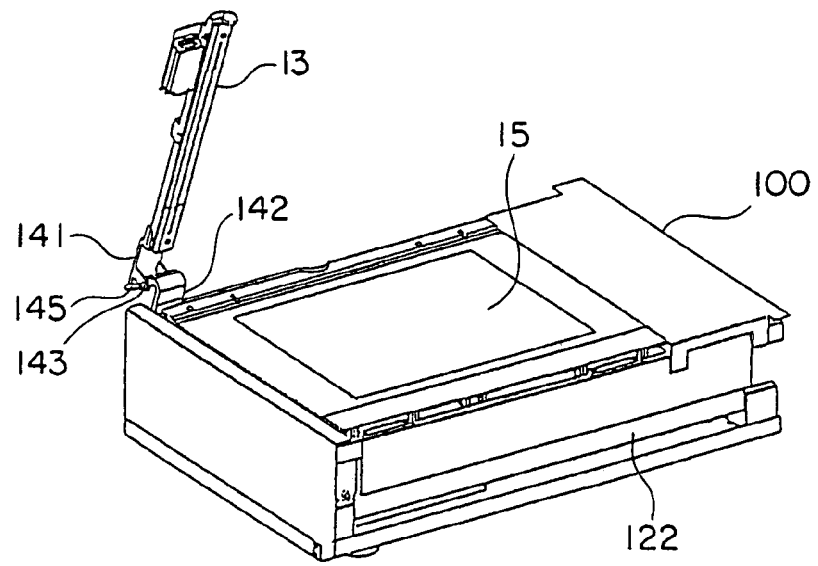

In FIG. 9, the transparency lamp unit 13 is screwed on the fixture 141 at one end. As shown in FIG. 8, the fixture 141 is attached to the fixture 142 on the flatbed carrier 11 through a pivot shaft 143. Thus, the fixture 141 and the transparency lamp unit 13 can be provided on the pivot shaft 143 so that they may pivotally move up and down, as shown in FIGS. 10 and 11B.

More specifically, as shown in FIG. 10, when the openable cover 101 of the high-resolution scanner is opened, the transparency lamp unit 13 movably attached on the undersurface of the cover 101 pivots together with the cover 101. FIG. 10 shows a state wherein the removable document table 15 has been removed, as described above. In FIG. 10, the reference numeral 103 indicates part of the housing 100. FIG. 11A shows a situation wherein the cover 101 has been removed (in a side view) and FIG. 11B also shows the state wherein the cover 101 has been removed (in a perspective view). As seen from these figures, the cover 101 is not provided within a path over which the fixture 142 moves in the sub scanning direction so that the cover 101 may not interfere with the movement.

Although not shown, a cover glass for covering the irradiation surface of the transparency lamp unit 13 is provided so that it may be removed from the frame of the transparency lamp unit 13. This may allow the user to clean out dirt and dust inside the transparency lamp unit 13. As seen from FIG. 10 etc., the transparency lamp unit 13 is not built into the cover 101 but separately and independently provided to be exposed from the cover 101. This can allow the user to replace the transparency lamp unit 13 with ease when the amount of luminous from the transparency lamp unit 13 decreases due to aging.

A spring 145 is provided between the pivot shaft 143 and a protrusion 144 formed on the fixture 141. The spring 145 is a coil spring, for example. The spring 145 is provided not only on the this side of the fixture 141 visible in FIG. 9 but on the opposite side thereof invisible in FIG. 9. Thus, the fixture 141 (and the transparency lamp unit 13) can be strongly drawn toward the fixture 142 or the pivot shaft 143. Consequently, when the transparency lamp unit 13 moves in the sub scanning direction together with the flatbed carrier 11, the long bar-like transparency lamp unit 13 can be firmly fixed in place without rattling even under acceleration. In addition, this can prevent the amount of luminous from the transparency lamp unit 13 from varying due to vibration of the transparency lamp unit 13 and displacement between their relative positions while the flatbed carrier 11 is moving.

In this way, the transparency lamp unit 13 is fixed to the flatbed carrier 11 through a plurality of fixtures such as the fixture 141. Therefore, the transparency lamp unit 13 may be displaced from its proper attachment position as shown in FIGS. 4 and 5 due to various causes. These causes include, for example, replacement of the transparency lamp unit 13 by the user as described above and any shock or impact which may be given to the high-resolution scanner during transportation. The amount of luminous from the transparency lamp unit 13 may vary as described above. To avoid such problem, the control unit 16 detects the width of a ray bundle (the extent in the main scanning direction) from the transparency lamp unit 13 during a scanning operation before an image reading process starts and then causes the second driving unit 5 to drive the lens unit 4 in the main scanning direction based on the detected width. Thus, the optical axis can be positioned at the center of the ray bundle from the transparency lamp unit 13 to read an image more accurately (at a higher resolution).

While the present invention has been described above in terms of the preferred embodiment, many different variations may be possible within the scope of the present invention.

For example, since the platen glass provided as the document table 15 is removable, instead of the single platen glass, two platen glasses may be provided in a movable manner. In this case, one of the platen glasses which has a media placed thereon may be moved to the document table 15 for scanning the media, while the other may be moved outside the document table 15 to cause another media to be placed thereon during the scanning operation. This alternative configuration may increase the productivity in scanning.

The present invention may apply to any scanner other than the high-resolution scanner described above. In addition to these scanners, the present invention may also apply to any image reading apparatus which has lenses to optically read an image.

INDUSTRIAL APPLICABILITY

As described above, according to the image reading apparatus of the present invention, since the two lenses of low-resolution and high resolution can provide the first through third resolutions, the number of lenses can be smaller than that of the resolutions to be switched. This can reduce the price of the image reading apparatus satisfactorily. In particular, since the higher second and third resolutions can be achieved with the single lens, many different resolutions can be provided without the need for more expensive lenses. This can also reduce the price of the image reading apparatus more effectively.

Moreover, according to the image reading apparatus of the present invention, since the optical unit can be moved in the main scanning direction, all image data can be acquired throughout the image reading region by moving the optical unit in the main scanning direction, even when the readable region is limited to a central portion in the main scanning direction as a result of resolution switching.

The invention claimed is:

1. An image reading apparatus comprising:
   a lens unit having a low-resolution lens, a high-resolution lens and a first driving unit to drive the lenses; and
   a second driving unit to drive the lens unit,
   wherein, during a reading operation at a first resolution, the first driving unit drives the low-resolution lens and high-resolution lens and the second driving unit drives the lens unit, whereby the low-resolution lens is placed on the optical axis at a first location and the high-resolution lens is placed off the optical axis,
   wherein, during a reading operation at a second resolution, higher than the first resolution, the first driving unit drives the low-resolution lens and high-resolution lens and the second driving unit drives the lens unit, whereby the low-resolution lens is placed off the optical axis and the high-resolution lens is placed on the optical axis at a second location, and
   wherein, during a reading operation at a third resolution, higher than the second resolution, the first driving unit drives the low-resolution lens and high-resolution lens and the second driving unit drives the lens unit, whereby the low-resolution lens is placed off the optical axis and the high-resolution lens is placed on the optical axis at a third location.

2. The image reading apparatus according to claim 1, wherein the first driving unit has a motor and the motor of the first driving unit is also used as the motor of the second driving unit.

3. The image reading apparatus according to claim 1, further comprising:
   an optical unit having a CCD sensor unit and at least first and second mirrors, in addition to the lens unit and the second driving unit,
   wherein location of the optical axis for reading is determined so as to connect the CCD sensor unit and the first mirror and connect the first mirror and the second mirror in the optical unit, and
   wherein the first location is defined to be on the optical axis between the CCD sensor unit and the first mirror, the second location is defined to be on the optical axis between the first mirror and the second mirror and closer to the first mirror than the third location, and the third location is defined to be on the optical axis between the first mirror and the second mirror and closer to the second mirror than the second location.

4. The image reading apparatus according to claim 3, wherein, in the lens unit, the low-resolution lens and the high-resolution lens are integrally provided to be driven simultaneously, the low-resolution lens is provided in the vertical direction to be opposed to the CCD sensor unit, and the high-resolution lens is provided in the sub scanning direction.

5. The image reading apparatus according to claim 4, wherein, during a reading operation at the first resolution, the high-resolution lens is placed above the optical axis between the first mirror and the second mirror to be placed off the optical axis, and
   wherein, during a reading operation at the second or third resolution, the low-resolution lens is placed above the optical axis between the first mirror and the second mirror to be placed off the optical axis.

6. The image reading apparatus according to claim 5, wherein the reading operations at the first, second, and third resolution are mutually switchable, and
   wherein while switching from the reading operation at the first resolution to the reading operation at the second or third resolution, such a transitional situation occurs that the low-resolution lens is placed on the optical axis between the CCD sensor unit and the first mirror and the high-resolution lens is placed on the optical axis between the first mirror and the second mirror.

7. The image reading apparatus according to claim 1, further comprising:
   an optical unit having a CCD sensor unit and at least first and second mirrors, in addition to the lens unit and the second driving unit; and
   a third driving unit to drive the optical unit,
   wherein the optical unit can be moved in main scanning direction.

8. The image reading apparatus according to claim 7, further comprising:
   a flatbed carrier having the optical unit and the third driving unit;
   a fourth driving unit to drive the flatbed carrier; and
   a transparency lamp unit being used as a light source to read a transparency-film document and being provided on the flatbed carrier,
   wherein the flatbed carrier and the transparency lamp unit can be moved in sub scanning direction.

9. The image reading apparatus according to claim 8, further comprising:
   a reflection lamp unit being used as a light source to read a reflection-copy document and being provided on the flatbed carrier,
   wherein the flatbed carrier further comprises its cover, and wherein the reflection lamp unit is not covered by the cover of the flatbed carrier to be exposed.

10. The image reading apparatus according to claim 8, further comprising:
a fixture to attach the transparency lamp unit to the flatbed carrier,
wherein the fixture further comprises:
a first fixture member having a protrusion and being attached to one end of the transparency lamp unit;
a second fixture member being attached to the flatbed carrier, having a pivot shaft, and being attached to the first fixture rotatably through the pivot shaft; and
a spring provided between the protrusion and the pivot shaft to draw each other.

11. The image reading apparatus according to claim 10, further comprising:
a cover for the image reading apparatus and being provided in an openable manner,
wherein the transparency lamp unit is movably attached on the undersurface of the cover and pivots together with the cover when the cover is opened or closed.

12. The image reading apparatus according to claim 8, wherein the optical axis of the transparency lamp unit is corrected by detecting the width of a ray bundle from the transparency lamp unit and causing the second driving unit to drive the lens unit based on the detected width.

* * * * *